United States Patent
Hashimoto

(10) Patent No.: US 9,885,992 B2
(45) Date of Patent: Feb. 6, 2018

(54) DRIVE TRANSMISSION DEVICE AND IMAGE FORMING APPARATUS

(71) Applicant: Brother Kogyo Kabushiki Kaisha, Nagoya-shi, Aichi-ken (JP)

(72) Inventor: Yohei Hashimoto, Nagakute (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/630,433

(22) Filed: Jun. 22, 2017

(65) Prior Publication Data

US 2017/0371288 A1    Dec. 28, 2017

(30) Foreign Application Priority Data

Jun. 23, 2016 (JP) ................................. 2016-124477

(51) Int. Cl.
| | |
|---|---|
| *G03G 15/00* | (2006.01) |
| *F16H 1/22* | (2006.01) |
| *F16H 37/12* | (2006.01) |

(52) U.S. Cl.
CPC ........... *G03G 15/6552* (2013.01); *F16H 1/22* (2013.01); *F16H 37/12* (2013.01)

(58) Field of Classification Search
CPC ......... F16H 27/08; F16L 9/00; B65H 2403/40
See application file for complete search history.

(56) References Cited

U.S. PATENT DOCUMENTS

| | | | |
|---|---|---|---|
| 6,722,648 B2 * | 4/2004 | Tsusaka | B65H 5/06 |
| | | | 271/186 |
| 7,229,070 B2 | 6/2007 | Nakano | |
| 9,121,475 B2 | 9/2015 | Kuroda et al. | |
| 2004/0061278 A1 | 4/2004 | Nakano | |
| 2014/0291923 A1 | 10/2014 | Hashimoto | |
| 2014/0294476 A1 * | 10/2014 | Hashimoto | G03G 15/234 |
| | | | 399/361 |
| 2015/0033888 A1 | 2/2015 | Kuroda et al. | |
| 2017/0022018 A1 * | 1/2017 | Koda | B65H 3/0669 |

FOREIGN PATENT DOCUMENTS

| | | |
|---|---|---|
| JP | 2004-124988 A | 4/2004 |
| JP | 2009-107826 A | 5/2009 |
| JP | 2014-199367 A | 10/2014 |
| JP | 2015-523506 A | 8/2015 |

* cited by examiner

*Primary Examiner* — Victor Verbitsky
(74) *Attorney, Agent, or Firm* — Banner & Witcoff, Ltd.

(57) ABSTRACT

A drive transmission device includes a first gear, a second gear, a switch arm, a third gear, a first sector gear including a first teeth portion and rotatable about a second axis in a predetermined direction, a second sector gear including a second teeth portion and engaging the first sector gear movably with play in the predetermined direction, a lever, a solenoid, and a first urging member. The switch arm has a cam contact surface, and the second sector gear includes a cam configured to contact the cam contact surface. When the first sector gear rotates in the predetermined direction for a predetermined amount from a state where the third gear engages the first gear and where the first teeth portion and the second teeth portion disengage from the second gear, the first teeth portion engages the second gear, and the second teeth portion disengages from the second gear.

7 Claims, 8 Drawing Sheets

STOP MODE

STOP MODE

DRIVE TRANSMISSION DEVICE AND IMAGE FORMING APPARATUS

CROSS-REFERENCE TO RELATED APPLICATION

This application claims priority from Japanese Patent Application No. 2016-124477 filed on Jun. 23, 2016, the content of which is incorporated herein by reference in its entirety.

FIELD OF DISCLOSURE

Aspects of the disclosure relate to a drive transmission device and an image forming apparatus including the drive transmission device.

BACKGROUND

A known image forming apparatus is configured to form images on both surfaces of a sheet. In a simplex (single-sided) printing mode, a sheet is fed to an image forming unit where an image is formed on a single surface of the sheet, and then an ejection roller rotates in a forward direction to eject the sheet having the image on the surface onto the ejection tray. In a duplex (two-sided) printing mode, after an image is formed on a first surface of a sheet at the image forming unit, the ejection roller rotates in a reverse direction to convey the sheet having the image on the first surface to a reverse conveying path. Through the reverse conveying path, the sheet is reversed so that a second surface opposite to the first surface faces the image forming unit. After an image is formed on the second surface of the sheet at the image forming unit, the ejection roller rotates in the forward direction to eject the sheet having the images on both first and second surfaces onto the ejection tray.

This kind of image forming apparatus includes a motor and a drive transmission mechanism to transmit a drive force from the motor to an ejection roller. The ejection roller is controlled to do a forward rotation, a reverse rotation, and a stop depending on the transmission of the drive force.

Another known image forming apparatus uses a solenoid to control application of a drive force to an ejection roller for causing the ejection roller to do a forward rotation, a reverse rotation, and a stop. Typically, the use of a solenoid generates operating noise.

SUMMARY

Illustrative aspects of the disclosure provide a drive transmission device with reduced noise, such as operating noise and impact noise that may occur when an object collides with another object to switch between a drive force transmission and interruption, and further provide an image forming apparatus including the drive transmission mechanism.

According to an aspect of the disclosure, a drive transmission mechanism includes a first gear, a second gear spaced apart from the first gear and rotatable about a first axis, a third gear, a first sector gear, a second sector gear, a lever, a solenoid, and a first urging member. The third gear is held by the switch arm such that the third gear is rotatable and disposed in engagement with the second gear. The third gear is configured to engage and disengage from the first gear in response to pivoting of the switch arm. The first sector gear includes an engaging portion and a first teeth portion configured to engage the second gear. The first sector gear is rotatable about a second axis in a predetermined direction. The second sector gear includes a second teeth portion configured to engage the second gear. The second sector gear is rotatable about the second axis in the predetermined direction. The second sector gear engages the first sector gear movably with play in the predetermined direction. The lever includes a lever engaging portion configured to engage the engaging portion of the first sector gear. The first sector gear is not rotatable in the predetermined direction while the lever engaging portion of the lever engages the engaging portion of the first sector gear. The solenoid is connected to the lever and configured to move the lever between an engaging state where the lever engaging portion of the lever engages the engaging portion of the first sector gear and a disengaging state where the lever engaging portion of the lever is disengaged from the engaging portion of the first sector gear. The first urging member is configured to urge the first sector gear in the predetermined direction. The switch arm has a cam contact surface. The second sector gear further includes a cam configured to contact the cam contact surface of the switch arm. As the second sector gear rotates, positional relationship between the cam and the cam contact surface changes and the switch arm pivots. The first sector gear further includes a first toothless portion. When the third gear engages the first gear, the first toothless portion faces the second gear. The second sector gear further includes a second toothless portion. When the third gear engages the first gear, the second toothless portion faces the second gear. When the first sector gear rotates in the predetermined direction for a predetermined amount from a state where the third gear engages the first gear and where the first teeth portion and the second teeth portion disengage from the second gear, the first teeth portion engages the second gear, and the second teeth portion disengages from the second gear.

According to another aspect of the disclosure, an image forming apparatus includes an image forming unit configured to form an image on a sheet, a tray configured to support the sheet, an ejection roller configured to eject, to the tray, the sheet having an image thereon formed at the image forming unit, and a drive transmission mechanism configured to transmit a drive force to the ejection roller. The drive transmission mechanism includes the drive transmission device.

This structure can reduce operation noise and impact noise that may occur when the drive force is transmitted or interrupted.

BRIEF DESCRIPTION OF THE DRAWINGS

Reference is made to the following description taken in connection with the accompanying drawings, like reference numerals being used for like corresponding parts in the various drawings.

DETAILED DESCRIPTION

An embodiment of the disclosure will be described with reference to the following drawings.

Configuration of Image Forming Apparatus

Figure 1:
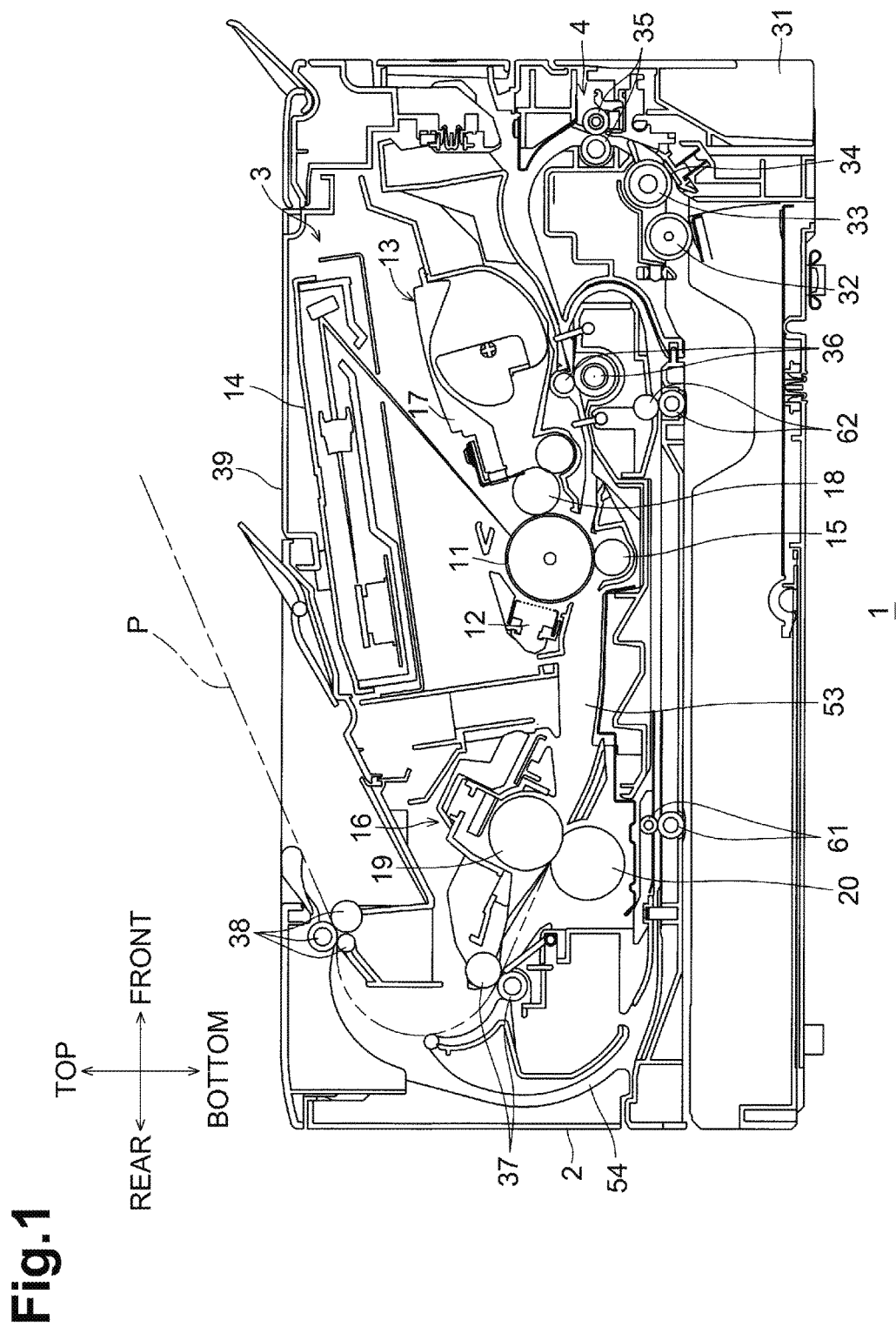
FIG. 1 is a sectional view of a laser printer according to an illustrative embodiment.

As illustrated in FIG. 1, a laser printer 1 as an example of an image forming apparatus is a monochrome laser printer. The laser printer 1 includes a main body casing 2. The main body casing 2 is substantially box-shaped, and accommodates an image forming unit 3 and a conveying unit 4 inside.

The image forming unit 3 includes a photosensitive drum 11, a charger 12, a developing unit 13, an exposing unit 14, a transfer roller 15, and a fixing unit 16.

The photosensitive drum 11 is rotatable about an axis extending in a width direction of the laser printer 1.

The charger 12 is disposed on a side of the photosensitive drum 11 opposite to the developing unit 13 relative to an axis of the photosensitive drum 11. The charger 12 is a scorotron-type charger including a wire or a grid.

In the following description, a side of the main body casing 2, relative to an axis of the photosensitive drum 11, where the charger 12 is disposed, refers to a rear side, and its opposite side, where the developing unit 13 is disposed, refers to a front side. The top or upper side, the bottom or lower side, the left or left side, and the right or right side are determined when the laser printer 1 is viewed from the front side.

The developing unit 13 is disposed in front of the photosensitive drum 11. The developing unit 13 includes a casing 17 for storing toner, and a developing roller 18 supported by the casing 17. The photosensitive drum 18 is disposed rotatably about an axis extending in the width direction of the laser printer 1. The peripheral surface of the developing roller 18 is in contact with the peripheral surface of the photosensitive drum 11.

The exposure unit 14 is disposed above the photosensitive drum 11, the charger 12, and the developing unit 13. The exposure unit 14 includes a light source and a polygon mirror, and is configured to irradiate the peripheral surface of the photosensitive drum 11 with laser beam as modulated based on image data.

The transfer roller 15 is disposed below the photosensitive drum 11. The transfer roller 15 is rotatable about an axis extending in the width direction of the laser printer 1.

The fixing unit 16 is disposed at the rear of the charger 12. The fixing unit 16 includes a heat roller 19 and a pressure roller 20. The heat roller 19 is rotatable about an axis extending in the width direction of the laser printer 1. The pressure roller 20 is disposed below the heat roller 19 to the rear and is rotatable about an axis extending in the width direction of the laser printer 1. The peripheral surface of the heat roller 19 is in contact with the peripheral surface of the pressure roller 20.

The conveying unit 4 includes a sheet supply cassette 31, a pickup roller 32, a separation roller 33, a separation pad 34, conveying rollers 35, 36, 37, ejection rollers 38, and an ejection tray 39 as an example of a tray.

The sheet supply cassette 31 is disposed at a bottom portion of the main body casing 2. The sheet supply cassette 31 is pullable to the front side from the main body casing 2. The sheet supply cassette 31 accommodates a stack of sheets P.

The ejection tray 39 is provided on an upper surface of the main body casing 2.

In printing, the conveying unit 4 conveys a sheet P to the image forming unit 3 where an image is formed on the sheet P.

When the pickup roller 32 in contact with the uppermost sheet P rotates counterclockwise viewed from the left side, the uppermost sheet P and a few subsequent sheets P are fed frontward from the sheet supply cassette 31. The sheets P are introduced between the separation roller 33 and the separation pad 34, and only the uppermost sheet P passes through between the separation roller 33 and the separation pad 34. The sheet P is conveyed between the conveying rollers 35, the conveying rollers 36, the photosensitive drum 11 and the transfer roller 15, the heat roller 19 and the pressure roller 20 of the fixing unit 16, the conveying rollers 37, and then among the ejection rollers 38 in this order. The conveying rollers 35, 36, the photosensitive drum 11 and the transfer roller 15, the heat roller 19 and the pressure roller 20 of the fixing unit 16, the conveying rollers 37 and the ejection rollers 38 define a conveying path 53 shaped like a letter S in side view.

The photosensitive drum 11 is configured to rotate clockwise viewed from the left side. The surface of the photosensitive drum 11 is uniformly charged by the charger 12 and then selectively exposed to laser beam from the exposing unit 14. This exposure selectively removes electric charges from the surface of the photosensitive drum 11 to form an electrostatic latent image on the surface of the photosensitive drum 11. The electrostatic latent image is developed into a toner image with toner supplied from the developing roller 18 of the developing unit 13.

The sheet P is conveyed between the photosensitive drum 11 and the transfer roller 15 when the toner image on the photosensitive drum 11 faces the transfer roller 15. The transfer roller 15 receives a transfer bias. When the sheet P passes through between the photosensitive drum 11 and the transfer roller 15, the toner image on the photosensitive drum 11 is transferred onto a first surface of the sheet P by the transfer bias. The sheet P having the toner image is conveyed toward the fixing unit 16. In the fixing unit 16, the sheet P passes through between the heat roller 19 and the pressure roller 20. The toner image is fixed onto the sheet P by heat and pressure.

The laser printer 1 has simplex printing mode and a duplex printing mode. The simplex printing mode allows printing of a sheet P on a single surface. The duplex printing mode allows printing of a sheet P on both surfaces.

In the simplex printing mode, the sheet P having an image on a first surface is ejected by the conveying rollers 37 and the ejection rollers 38 to the ejection tray 39.

The main body casing 2 defines a reverse conveying path 54 inside. The reverse conveying path 54 extends downward from a point midway between the conveying rollers 37 and the ejection rollers 38 via a rear end portion of the main body casing 2, then frontward between the image forming unit 3 and the sheet supply cassette 31, and is connected to the conveying path 53 midway between the conveying rollers 35 and 36. First reverse conveying rollers 61 and second reverse conveying rollers 62 are provided on the reverse conveying path 54.

In the duplex printing mode, the sheet P having an image on a first surface is conveyed to the reverse conveying path 54 by the ejection rollers 38 without being fully ejected onto the ejection tray 39. The sheet P is conveyed frontward on the reverse conveying path 54 and then to the conveying path 53 by the first reverse conveying rollers 61 and the second reverse conveying rollers 62. The sheet P is conveyed from the reverse conveying path 54 back through the conveying path 53, where the sheet P is conveyed between the photosensitive drum 11 and the transfer roller 15 with a second surface, which is blank, of the sheet P facing the photosensitive drum 11. The sheet P having an image on the second surface is ejected by the conveying rollers 37 and the ejection rollers 38 to the ejection tray 39.

Configuration of a Drive Transmission Mechanism

Figure 2:
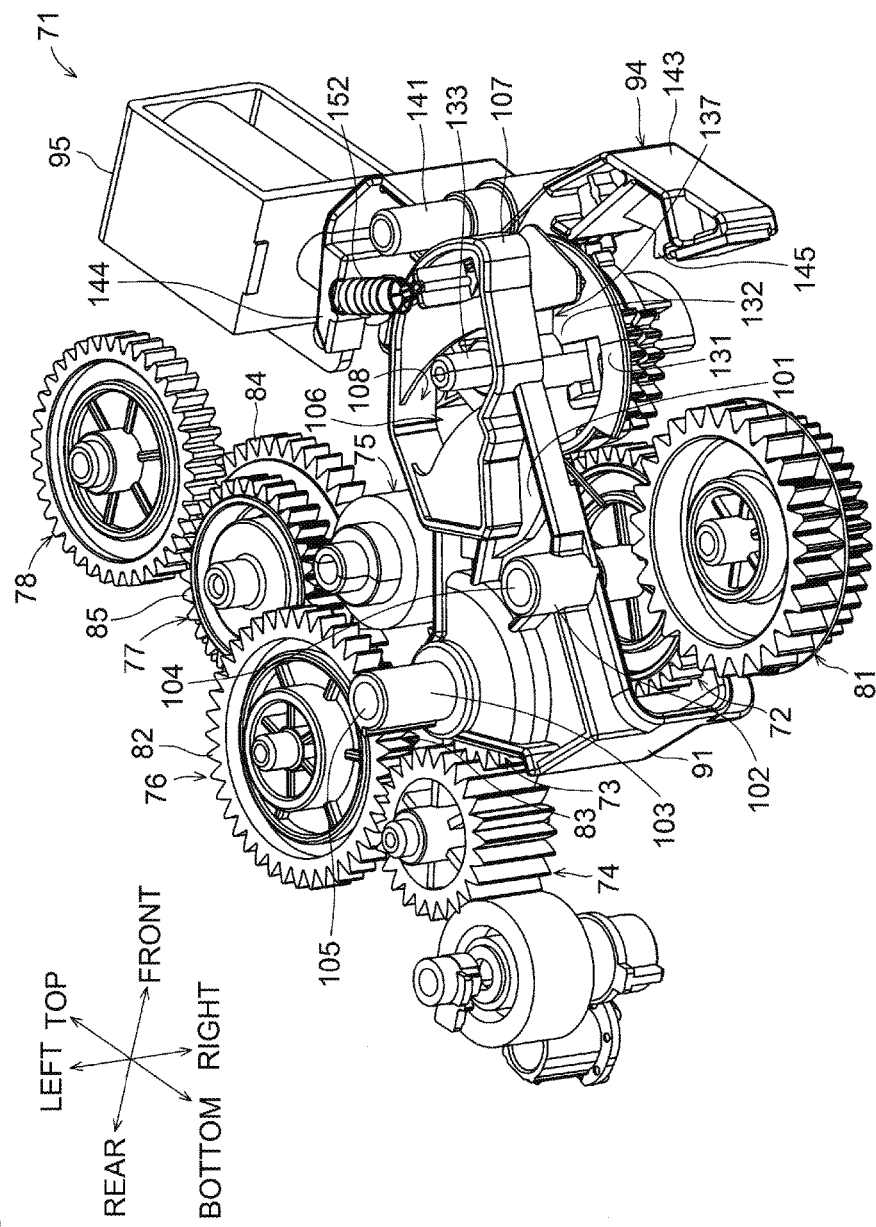
FIG. 2 is a perspective view of a drive transmission mechanism of the laser printer.

As illustrated in FIG. 2, the laser printer 1 includes a drive transmission mechanism 71. The drive transmission mechanism 71 is configured to transmit a drive force from a motor (not illustrated) to a drive roller of the ejection rollers 38. For the sake of description, the drive roller of the ejection rollers 38 is hereinafter referred to as an ejection roller 38. The drive transmission mechanism 71 is further configured to control the ejection roller 38 to do a forward rotation, a reverse rotation, and a stop. When the ejection roller 38 rotates in a forward direction, a sheet P is conveyed to the ejection tray 39. When the ejection roller 38 rotates in a reverse direction, a sheet P is conveyed to the reverse conveying path 54.

Figure 3:
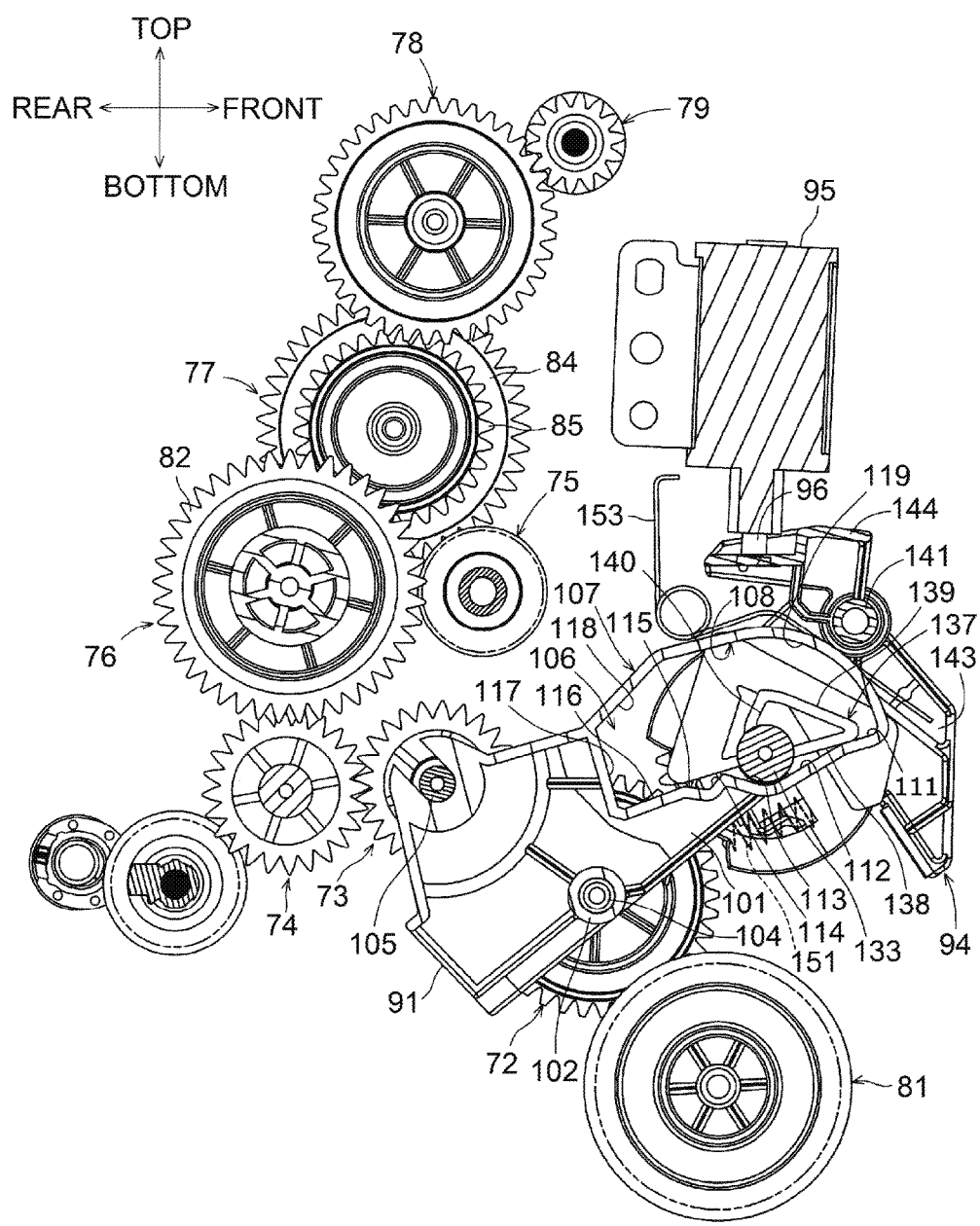
FIG. 3 is a left sectional view of the drive transmission mechanism.
Figure 4:
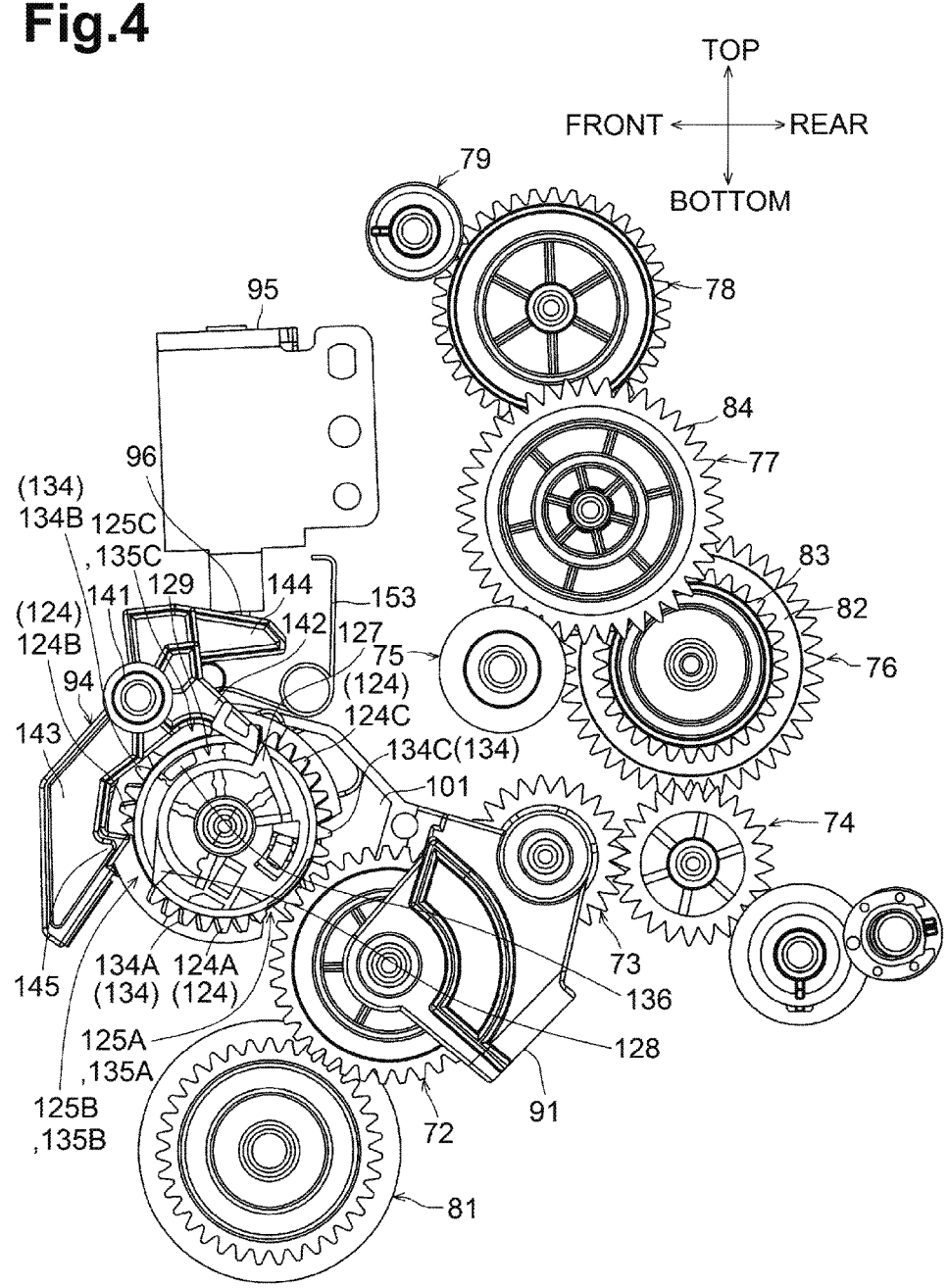
FIG. 4 is a right side view of the drive transmission mechanism.

As illustrated in FIGS. 2, 3, and 4, the drive transmission mechanism 71 includes a drive gear 72 as an example of a second gear, a pendulum gear 73 as an example of a third gear, a first intermediate input gear 74, a second intermediate input gear 75 as an example of a first gear, a first idle gear 76, a second idle gear 77, a third idle gear 78, and an ejection roller gear 79. The drive gear 72, the first intermediate input gear 74, the second intermediate input gear 75, the first idle gear 76, the second idle gear 77, the third idle gear 78, and the ejection roller gear 79 are rotatably held by a left side plate (not illustrated) disposed in the main body casing 2.

The drive gear 72 is a spur gear. The drive gear 72 engages an input gear 81. The input gear 81 receives a drive force from the motor and then transmits the drive force to the drive gear 72.

The pendulum gear 73 is a spur gear. The pendulum gear 73 engages the drive gear 72.

The first intermediate input gear 74 and the second intermediate input gear 75 are spur gears. The number of teeth of the first intermediate input gear 74 is equal to the number of teeth of the second intermediate input gear 75. Centers of the first intermediate input gear 74 and the second intermediate input gear 75 are positioned outside an arc centered on a center of the drive gear 72 with a radius extending from a center of the first intermediate input gear 74 to a center of the second intermediate input gear 75. A center of the pendulum gear 73 is positioned inside a triangle whose vertexes are the centers of the drive gear 72, the first intermediate input gear 74 and the second intermediate input gear 75. The center of the second intermediate input gear 75 is positioned further to the front and more upward than the center of the first intermediate input gear 74. The distance between the center of the drive gear 72 and the center of the second intermediate input gear 75 is substantially equal to the distance between the center of the drive gear 72 and the center of the first intermediate input gear 74.

The first idle gear 76 is a double-stack gear made up of a relatively large-diameter spur gear 82 and a relatively small-diameter spur gear 83, which are stacked on each other. The large-diameter spur gear 82 engages the first intermediate input gear 74.

The second idle gear 77 is a double-stack gear made up of a relatively large-diameter spur gear 84 and a relatively small-diameter spur gear 85, which are stacked on each other. The number of teeth of the large-diameter spur gear 84 is equal to the number of teeth of the large-diameter spur gear 82 of the first idle gear 76. The large-diameter spur gear 84 engages the second intermediate input gear 75. The number of teeth of the small-diameter spur gear 85 is equal to the number of teeth of the small-diameter spur gear 83 of the first idle gear 76. The small-diameter spur gear 85 engages the small-diameter spur gear 83 of the first idle gear 76.

The third idle gear 78 is a spur gear. The third idle gear 78 engages the small-diameter spur gear 85 of the second idle gear 77.

The ejection roller gear 79 is a spur gear. The ejection roller gear 79 engages the third idle gear 78.

The drive transmission mechanism 71 includes a switch arm 91, a first sector gear 92, a second sector gear 93, a lever 94, and a solenoid 95. The drive transmission mechanism 71 is configured to move the pendulum gear 73 between a state where it engages the first intermediate input gear 74 and a state where it engages the second intermediate input gear 75.

The switch arm 91 includes an arm main body 101 shaped like a plate extending in a front-rear direction and a vertical direction. In a state illustrated in FIGS. 2, 3, and 4, the pendulum gear 73 engages the first intermediate input gear 74 and the arm main body 101 is inclined upward to the front. The following description will be made based on this state.

As illustrated in FIG. 2, a rear lower portion of the arm main body 101 includes a first bearing portion 102 and a second bearing portion 103, which are substantially cylindrical in shape and protrude to the left.

As illustrated in FIG. 3, the first bearing portion 102 of the switch arm 91 receives a rotation shaft 104 of the drive gear 72 rotatably. The switch arm 91 is pivotable about the rotation shaft 104 of the drive gear 72.

The second bearing portion 103 of the switch arm 91 receives a rotation shaft 105 of the pendulum gear 73 rotatably.

An upper front portion of the arm main body 101 has an opening 106 passing therethrough in the width direction. As illustrated in FIGS. 2 and 3, the arm main body 101 includes a peripheral wall portion 107 entirely surrounding the opening 106 and protruding to the left. An inner surface of the peripheral wall portion 107 is a cam contact surface 108 that a cam 137 is to contact.

As illustrated in FIG. 3, the cam contact surface 108 has a first surface portion 111, a second surface portion 112, a third surface portion 113, a fourth surface portion 114 as an example of a first area, a fifth surface portion 115 as an example of a second area, a sixth surface portion 116, a seventh surface portion 117, an eighth surface portion 118, and a ninth surface portion 119. The first surface portion 111 is a flat surface inclined downward to the rear from a front end portion of the cam contact surface 108. The second surface portion 112 is a flat surface continuous with the first surface portion 111 and inclined downward to the rear at a steeper angle than the first surface portion 111. The third surface portion 113 is a flat surface continuous with the second surface portion 112 and inclined upward to the rear.

The fourth surface portion 114 is a flat surface continuous with the third surface portion 113 and inclined downward to the rear at a steeper angle than the second surface portion 112. The fifth surface portion 115 is a flat surface continuous with the fourth surface portion 114 and inclined upward to the rear at a steeper angle than the third surface portion 113. The sixth surface portion 116 is a flat surface continuous with the fifth surface portion 115 and inclined downward to the rear at the same angle as the first surface portion 112. The seventh surface portion 117 is a flat surface continuous with the sixth surface portion 116 and extending substantially perpendicularly to the sixth surface portion 116. The eighth surface portion 118 is a flat surface continuous with the seventh surface portion 117 and inclined upward to the front. The ninth surface portion 119 is a substantially arc-shaped surface continuous with a front end of the first surface portion 111 and a front end of the eighth surface portion 118 and bulging outward.

Figure 5:
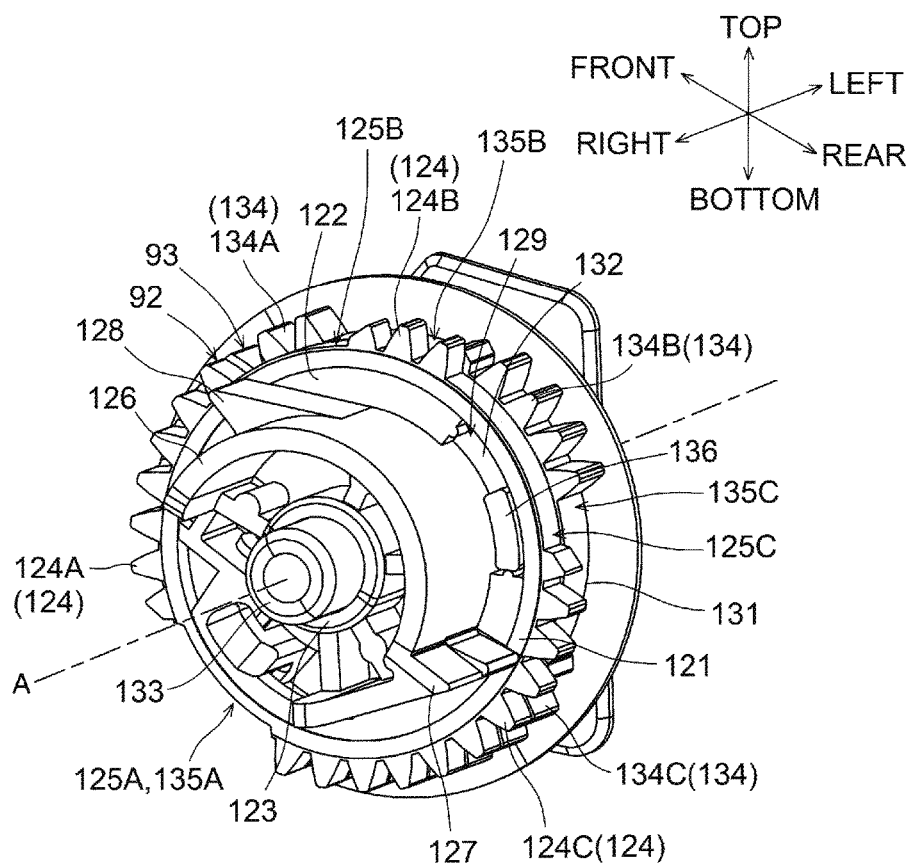
FIG. 5 is a perspective view of a first sector gear and a second sector gear of the drive transmission mechanism.

As illustrated in FIG. 5, the first sector gear 92 integrally includes a rim 121, a web 122, and a boss 123 as an example of a shaft hole.

The rim 121 has a cylindrical flattened shape. The first sector gear 92 includes, on an outer peripheral surface of the rim 121, a first sector gear teeth portion 124 having many gear teeth and a first sector gear toothless portion 125 having no teeth. The first sector gear teeth portion 124 has a first teeth portion 124A, a second teeth portion 124B, and a third teeth portion 124C, which are located at three positions spaced apart from one another on the outer peripheral surface of the rim 121. The first sector gear toothless portion 125 includes a first toothless portion 125A, a second toothless portion 125B, and a third toothless portion 125C. As illustrated in FIG. 5, on the outer peripheral surface of the rim 121, the first toothless portion 125A is defined between the first teeth portion 124A and the third teeth portion 124C, the second toothless portion 125B is defined between the first teeth portion 124A and the second teeth portion 124B, and the third toothless portion 125C is defined between the second teeth portion 124B and the third teeth portion 124C.

The web 122 is shaped like a plate extending annularly from all around the rim 121 toward a center of the first sector gear 92. The web 122 includes, at a middle portion of the web 122 in its radial direction, an engaging wall portion 126 extending to the right and having substantially a semicircular arc shape. The engaging wall portion 126 integrally includes a first engaging portion 127 as an example of an engaging portion, and a second engaging portion 128. The first engaging portion 127 and the second engaging portion 128 are spaced apart from each other in a rotation direction of the first sector gear 92, and protrude from the engaging wall portion 126 outward in the radial direction. The web 122 has an elongated hole 129 between the engaging wall portion 126 and the rim 121. The elongated hole 129 extends in the rotation direction of the first sector gear 92 and passes through the web 122 in the width direction (left-right direction).

The boss 123 is substantially cylindrical in shape and extends from an inner peripheral edge of the web 122 to the right.

As illustrated in FIGS. 2 and 5, the second sector gear 93 integrally includes a rim 131, a web 132, and a boss 133 as an example of a shaft hole. The second sector gear 93 and the first sector gear 92 are rotatable about a common axis A.

The rim 131 has a cylindrical flattened shape. The second sector gear 93 includes, on an outer surface of the rim 131, a second sector gear teeth portion 134 having many gear teeth and a second sector gear toothless portion 135 having no teeth. The second sector gear teeth portion 134 has a first teeth portion 134A, a second teeth portion 134B, and a third teeth portion 134C, which are spaced apart from each other on the outer surface of the rim 131. The second sector gear toothless portion 135 includes a first toothless portion 135A, a second toothless portion 135B, and a third toothless portion 135C. As illustrated in FIG. 5, on the outer surface of the rim 131, the first toothless portion 135A is defined between the first teeth portion 134A and the third teeth portion 134C, the second toothless portion 135B is defined between the first teeth portion 134A and the second teeth portion 134B, and the third toothless portion 135C is defined between the second teeth portion 134B and the third teeth portion 134C.

The web 132 is shaped like a plate extending annularly from all around the rim 121 toward a center of the first sector gear 92. The web 132 includes, at a middle portion of the web 132 in its radial direction, a protrusion 136 protruding to the right in the elongated hole 129 of the first sector gear 92. The dimension of the protrusion 136 is smaller in the rotation direction of the second sector gear 93 than the dimension of the elongated hole 129.

The boss 133 is substantially cylindrical in shape and extends from an inner peripheral edge of the web 132 to both the left and the right. The outside diameter of the boss 133 is smaller than the inner diameter of the boss 123 of the first sector gear 92.

As illustrated in FIGS. 2 and 3, the second sector gear 93 includes a cam 137 to the right of the web 132. As illustrated in FIG. 3, the cam 137 has a first cam surface 138, a second cam surface 139, and a third cam surface 140. The first cam surface 138 extends from the boss 133 in the radial direction of the second sector gear 93. The second cam surface 139 is continuous with the first cam surface 138 and extends at an angle of substantially 30 degrees relative to the first cam surface 138. The third cam surface 140 extends between the boss 133 and the second cam surface 139 at an angle of substantially 90 degrees relative to the second cam surface 139.

The second sector gear 93 and the first sector gear 92 engage each other movably with play in their rotation direction. Specifically, the rim 131 of the second sector gear 93 is disposed to the left of the rim 121 of the first sector gear 92, and the boss 133 of the second sector gear 93 is inserted into the boss 123 of the first sector gear 92 from the left. The protrusion 136 of the second sector gear 93 is inserted into the elongated hole 129 of the first sector gear 92 from the left. As illustrated in FIG. 2, the first sector gear 92 and the second sector gear 93 are located such that the boss 133 of the second sector gear 93 passes through the opening 106 of the switch arm 91 and the cam 137 faces the cam contact surface 108 of the switch arm 91. The right end portion of the boss 133 is rotatably held by the left side plate (not illustrated) disposed in the main body casing 2.

When the first sector gear 92 engages the second sector gear 93, the first teeth portion 124A of the first sector gear teeth portion 124 of the first sector gear 92 substantially coincides with the first teeth portion 134A of the second sector gear teeth portion 134 of the second sector gear 93 in their rotation direction, the second teeth portion 124B of the first sector gear teeth portion 124 of the first sector gear 92 substantially coincides with the second teeth portion 134B of the second sector gear teeth portion 134 of the second sector gear 93 in their rotation direction, and the third teeth portion 124C of the first sector gear teeth portion 124 of the first sector gear 92 substantially coincides with the third teeth portion 134C of the second sector gear teeth portion 134 of the second sector gear 93 in their rotation direction. In addition, the first toothless portion 125A of the first sector gear teeth portion 125 of the first sector gear 92 substantially coincides with the first toothless portion 135A of the second sector gear teeth portion 135 of the second sector gear 93 in their rotation direction, the second toothless portion 125B of the first sector gear teeth portion 125 of the first sector gear 92 substantially coincides with the second toothless portion 135B of the second sector gear teeth portion 135 of the second sector gear 93 in their rotation direction, and the third toothless portion 125C of the first sector gear teeth portion 125 of the first sector gear 92 substantially coincides with the third toothless portion 135C of the second sector gear teeth portion 135 of the second sector gear 93 in their rotation direction.

As illustrated in FIGS. 2, 3, and 4, the lever 94 integrally includes a lever shaft portion 141, a first arm portion 142, a second arm portion 143, and an operation portion 144.

The lever shaft portion 141 is cylindrical in shape and extends in the width direction. The right end portion of the lever shaft portion 141 is rotatably held by the left side plate (not illustrated) disposed in the main body casing 2.

As illustrated in FIG. 4, the first arm portion 142 extends from the lever shaft portion 141 downward to the rear.

The second arm portion 143 extends from the lever shaft portion 141 downward to the front, and has, at its end portion, a stopper portion 145 in the shape of substantially a triangle, in side view, protruding to the rear, which gives substantially a hook shape to the second arm portion 143. The stopper portion 145 is an example of a lever engaging portion.

The operation portion 144 extends upward from the lever shaft portion 141 and bends to the rear.

The solenoid 95 is disposed above the operation portion 144 of the lever 94 and fixed to the left side plate (not illustrated) disposed in the main body casing 2. The solenoid 95 has a plunger 96. An end portion of the plunger 96 faces downward. The end portion of the plunger 96 is connected to the operation portion 144 of the lever 94.

The position of the lever 94 with the solenoid 95 turned off is defined as a first lever position. When the lever 94 is at the first lever position, the end portion of the first arm portion 142 of the lever 94 is located within a ring-shaped area defined as a track of the first engaging portion 127 and the second engaging portion 128, which move with the rotation of the first sector gear 92, and the stopper portion 145 of the second arm portion 143 is located outside of an outer peripheral edge of the ring-shaped area.

When the solenoid 95 is turned off to on, the plunger 96 moves upward. With the upward movement of the plunger 96, the operation portion 144 of the lever 94 located at the first lever position moves upward. Concurrently with the movement of the operation portion 144, the lever 94 rotates about the lever shaft portion 141 for a fixed angle counterclockwise viewed from the right side. The position of the lever 94 in this state is defined as a second lever position. When the lever 94 is at the second lever position, the stopper portion 145 of the second arm portion 143 of the lever 94 is located within the ring-shaped area, and the end portion of the first arm portion 142 is located outside of the outer peripheral edge of the ring-shaped area.

When the solenoid 95 is turned on to off, the plunger 96 moves downward, and the operation portion 144 of the lever 94 located at the second lever position moves downward. Concurrently with the movement of the operation portion 144, the lever 94 rotates about the lever shaft portion 141 for a fixed angle clockwise viewed from the right side.

The drive transmission mechanism 71 further includes a first urging member 151, a second urging member 152, and a third urging member 153.

As illustrated in FIG. 3, the first urging member 151 is a coil spring. The first urging member is connected at one end to the first sector gear 92 and at the other end to the second sector gear 93. The first urging member 151 urges the first sector gear 92 clockwise viewed from the left side.

As illustrated in FIG. 2, the second urging member 152 is a coil spring. One end of the second urging member 152 is disposed above a front end portion of the switch arm 91 and fixed to the left side plate (not illustrated) disposed in the main body casing 2. The other end of the second urging member 152 is connected to the front end portion of the switch arm 91. The second urging member 152 urges the front end portion of the switch arm 91 upward.

As illustrated in FIG. 3, the third urging member 153 is a helical torsion spring. One end of the third urging member 153 is fixed to the left side plate (not illustrated) disposed in the main body casing 2. The other end of the third urging member 153 is in contact with the second sector gear 93. The third urging member 153 urges the second sector gear 93 clockwise viewed from the left side.

Operation of Drive Transmission Mechanism

With the above configuration, the drive transmission mechanism 71 is configured to, in a forward rotation mode (simplex mode), cause the ejection roller 38 to rotate in the forward direction; in a reverse rotation mode (duplex mode), cause the ejection roller 38 to rotate in the reverse direction; and, in a stop mode, cause the ejection roller 38 to stop rotating or not transmit the drive force to the ejection roller 38.

By controlling energization of the solenoid 95, the drive transmission mechanism 71 is switched from the forward rotation mode to the reverse rotation mode, from the reverse rotation mode to the stop mode, and further from the stop mode to the forward rotation mode.

Figure 6A:
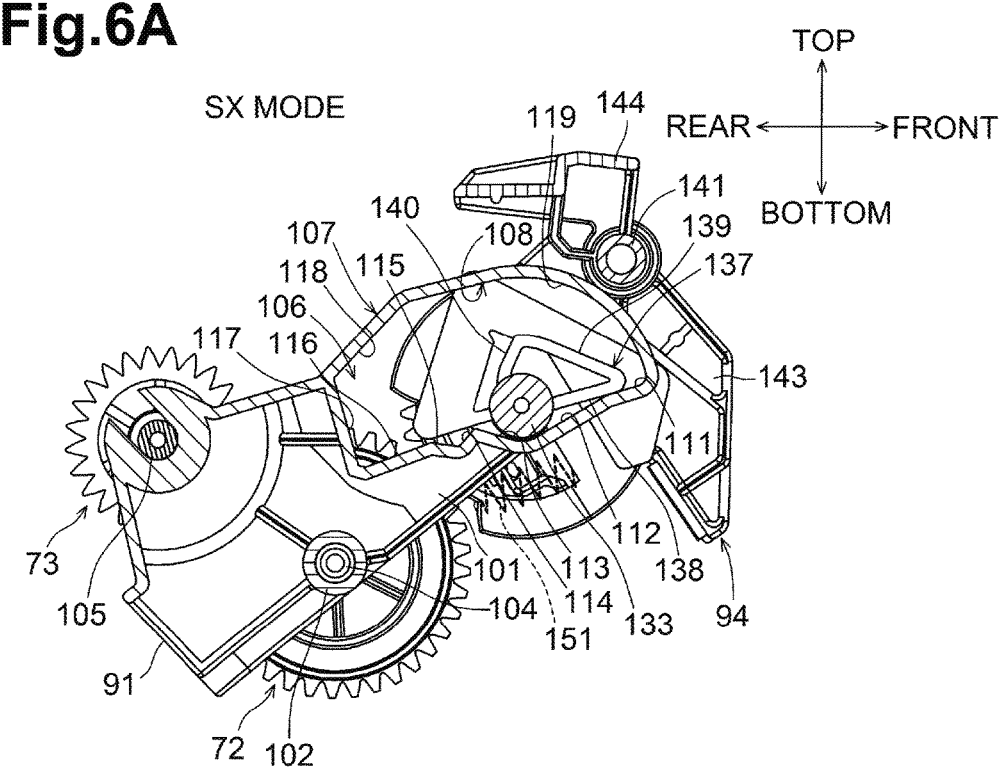
FIG. 6A is a left sectional view partially illustrating the drive transmission mechanism in a forward rotation mode.

In the forward rotation mode, as illustrated in FIG. 6A, the first cam surface 138 of the cam 137 of the second sector gear 93 contacts the first surface portion 111 of the cam contact surface 108 of the switch arm 91. At this time, the switch arm 91 pivots about the first bearing portion 102 (the rotation shaft 104 of the drive gear 72), and the front end portion of the switch arm 91 is raised to its most upward position by the urging force of the second urging member 152 (FIG. 2). Under this state, the pendulum gear 73 engages the first intermediate input gear 74. Thus, the drive force of the motor is transmitted from the drive gear 72, via the pendulum gear 73, the first intermediate input gear 74, the first idle gear 76, the second idle gear 77 and the third idle gear 78, to the ejection roller gear 79, and the ejection roller 38 rotates in the forward direction integrally with the ejection roller gear 79.

Figure 6B:
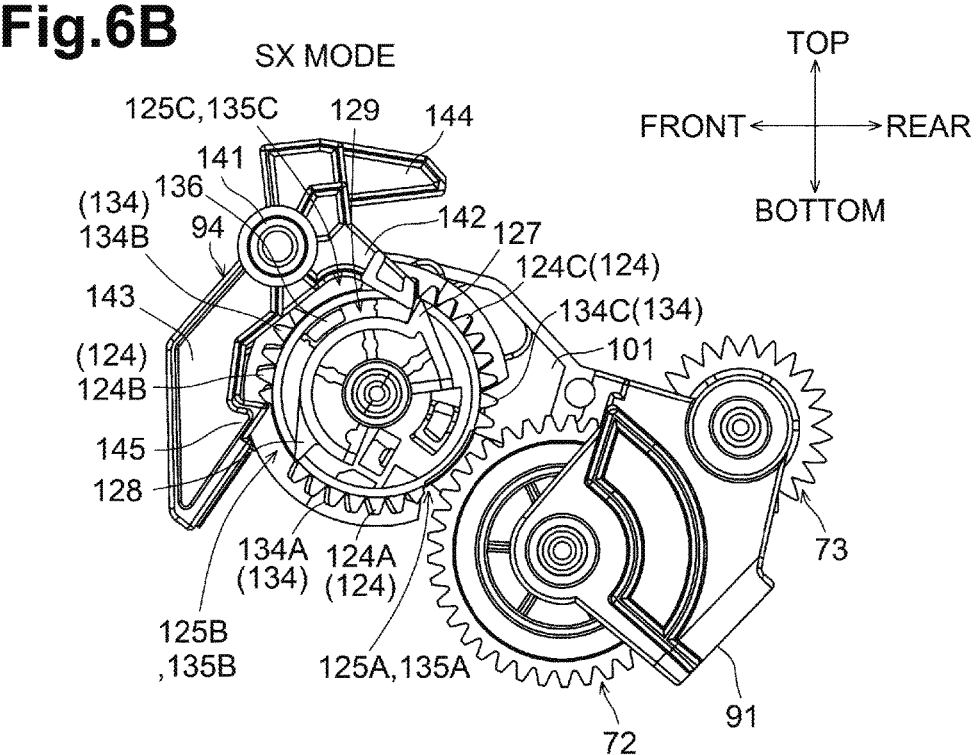
FIG. 6B is a right side view partially illustrating the drive transmission mechanism in the forward rotation mode.

Further, in the forward rotation mode, as illustrated in FIG. 6B, the solenoid 95 is off and the lever 94 is located at the first lever position. In this state, the second sector gear 93 is urged counterclockwise viewed from the right side by the third urging member 153 (FIG. 4). The third urging member 153 urges the first urging member 151 in a direction to compress the first urging member 151. Restoring force of the first urging member 151 causes the first engaging portion 127 to engage the first arm portion 142 of the lever 94, making the first sector gear 92 unable to rotate. The second sector gear 93 is capable of rotating in a range where the protrusion 136 protruding in the elongated hole 129 is allowed to move.

As illustrated in FIG. 6B, when the first engaging portion 127 engages the first arm portion 142 of the lever 94, the first toothless portion 125A of the first sector gear 92 and the first toothless portion 135A of the second sector gear 93 face the drive gear 72, while the first sector gear teeth portion 124 of the first sector gear 92 and the second gear teeth portion 134 of the second sector gear 93 does not engage the drive gear 72. The range where the second sector gear 93 is capable of rotating is determined by dimensions of the elongated hole 129 and the protrusion 136 in the rotation direction. The range is smaller than the first toothless portion 135A of the second sector gear 93 in the rotation direction. Thus, even when the second sector gear 93 rotates in the range, the first toothless portion 135A of the second sector gear 93 only faces the drive gear 72, and the second gear teeth portion 134 of the second sector gear 93 does not engage the drive gear 72.

[Forward Rotation Mode to Reverse Rotation Mode]

When the solenoid 95 is turned off to on, the drive transmission mechanism 71 is switched from the forward rotation mode to the reverse rotation mode. When the solenoid 95 is turned on, the operation portion 144 of the lever 94 moves upward as illustrated in FIG. 7B. Concurrently with the movement of the operation portion 144, the lever 94 rotates about the lever shaft portion 141 for a fixed angle counterclockwise viewed from the right side, and the lever 94 is located at the second lever position. At this time, the first engaging portion 127 of the first sector gear 92 and the end portion of the first arm portion 142 disengage from each other such that the first sector gear 92 becomes rotatable.

When the first engaging portion 127 of the first sector gear 92 and the end portion of the first arm portion 142 disengage from each other, restoring force of the first urging member 151 causes the first sector gear 92 to rotate counterclockwise viewed from the right side. When the first sector gear 92 rotates, the first teeth portion 124A of the first sector gear 92 starts to engage the drive gear 72. When the first teeth portion 124A engages the drive gear 72, the drive force is transmitted from the drive gear 72 to the first sector gear 92. After the first teeth portion 124A starts to engage the drive gear 72, the drive force is transmitted from the drive gear 72 to the first sector gear 92, and the first sector gear 92 rotates.

When the first sector gear 92 rotates, an end of the elongated hole 129 of the first sector gear 92 contacts the protrusion 136 of the second sector gear 93, and the end of the elongated hole 129 presses the protrusion 136 in the rotation direction. This pressing force and the urging force of the third urging member 153 (FIG. 4) causes the second sector gear 93 to start to rotate clockwise viewed from the left side. When the second sector gear 93 rotates, the first teeth portion 134A of the second sector gear 93 starts to engage the drive gear 72. When the first teeth portion 134A engages the drive gear 72, the drive force is transmitted from the drive gear 72 to the second sector gear 93. After the first teeth portion 134A starts to engage the drive gear 72, the drive force is transmitted from the drive gear 72 to the second sector gear 93, and the second sector gear 93 rotates.

Figure 7A:
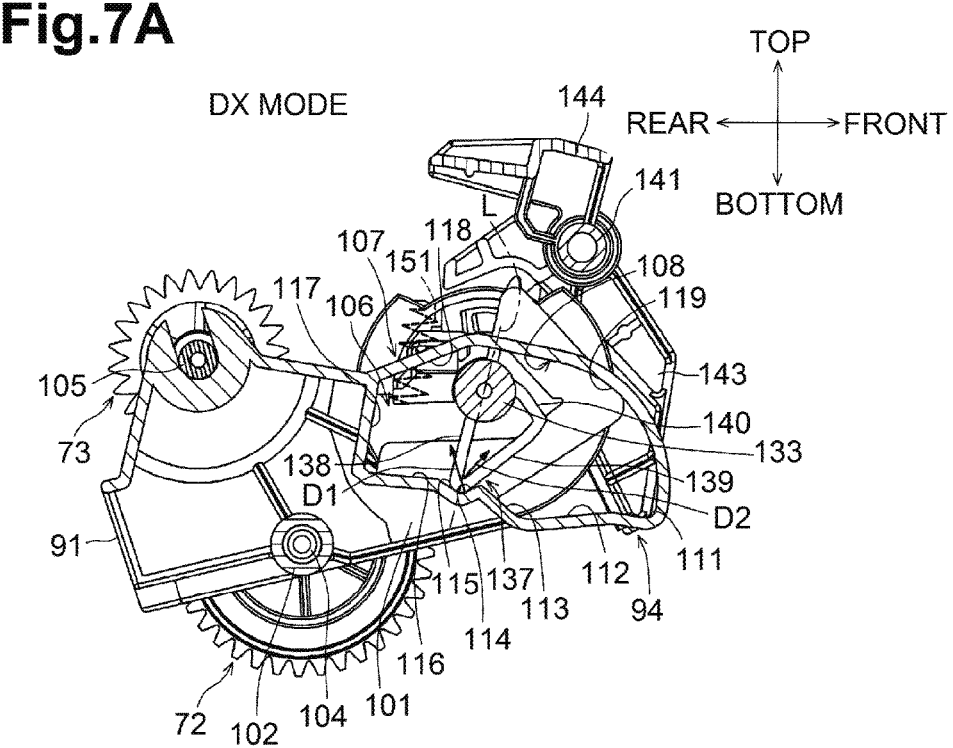
FIG. 7A is a left sectional view partially illustrating the drive transmission mechanism in a reverse rotation mode.
Figure 7B:
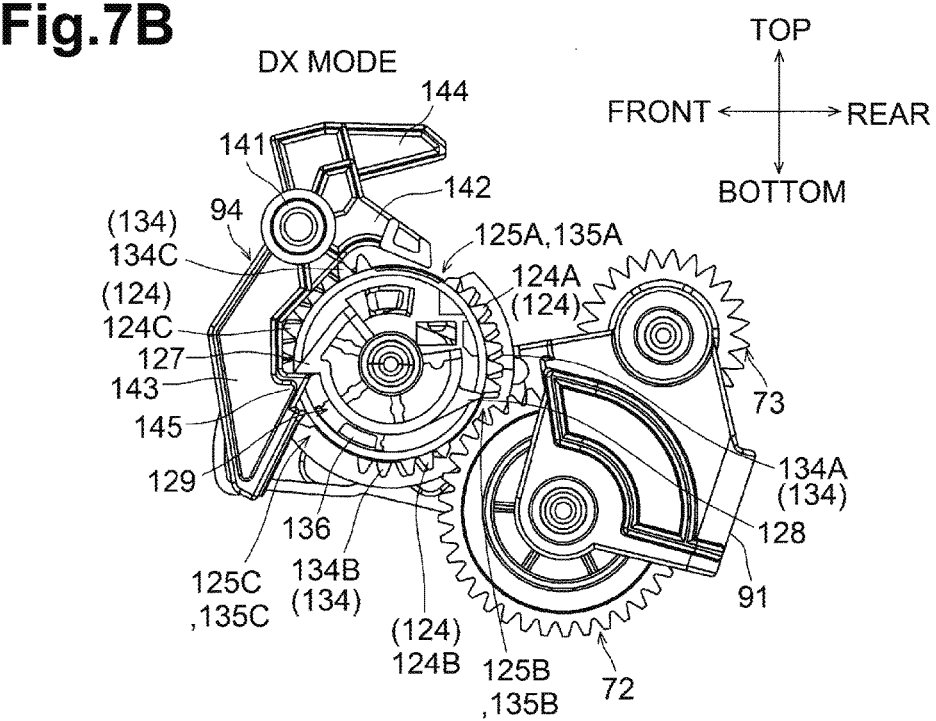
FIG. 7B is a right sectional view partially illustrating the drive transmission mechanism in the reverse forward rotation mode.

When the second sector gear 93 rotates, the cam 137 rotates clockwise viewed from the left side as illustrated in FIGS. 6A and 7A. As the cam 137 rotates, the positional relationship between the cam 137 and the cam contact surface 108 of the switch arm 91 changes. In other words, the first cam surface 138 of the cam 137 contacts the first surface portion 111 of the cam contact surface 108 (FIG. 6A), the connection portion between the first cam surface 138 and the second cam surface 139 of the cam 137 contacts the second surface portion 112 of the cam contact surface 108, and then the connection portion between the first cam surface 138 and the second cam surface 139 contacts the third surface portion 113 of the cam contact surface 108. With the change of the positional relationship between the cam 137 and the cam contact surface 108, the cam contact surface 108 receives a downward pressing force from the cam 137. This force causes the switch arm 91 to pivot about the first bearing portion 102 clockwise viewed from the left side such that the front end portion of the switch arm 91 moves downward. When the switch arm 91 pivots, the pendulum gear 73 disengages from the first intermediate input gear 74 and moves toward the second intermediate input gear 75.

As illustrated in FIG. 7B, when the rotation of the first sector gear 92 and the second sector gear 93 further advances, the second toothless portion 125B of the first sector gear 92 and the second toothless portion 135B of the second sector gear 93 start to face the drive gear 72, while the first teeth portion 124A of the first sector gear 92 and the first teeth portion 134A of the second sector gear 93 start to disengage from the drive gear 72. When the first teeth portion 124A of the first sector gear 92 and the first teeth portion 134A of the second sector gear 93 disengage from the drive gear 72, the drive force is not transmitted from the drive gear 72 to the first sector gear 92 and the second sector gear 93. Then, the first sector gear 92 and the second sector gear 93 rotate by the urging force of the third urging member 153 until the first engaging portion 127 of the first sector gear 92 engages the stopper portion 145 of the second arm portion 143 of the lever 94. When the first engaging portion 127 of the first sector gear 92 engages the stopper portion 145 of the second arm portion 143 of the lever 94, the first sector gear 92 and the second sector gear 93 stop rotating, and the second toothless portion 125B of the first sector gear 92 and the second toothless portion 135B of the second sector gear 93 are kept facing the drive gear 72. After the first engaging portion 127 contacts the stopper portion 145, the first urging member 151 is compressed by the urging force of the third urging member 153. Restoring force of the compressed first urging member 151 presses the first engaging portion 127 against the stopper portion 145 and maintains the engagement between the first engaging portion 127 and the stopper portion 145.

Before the second sector gear 93 stops rotating, the connection portion between the first cam surface 138 and the second cam surface 139 of the cam 137 moves over the boundary between the third surface portion 113 and the fourth surface portion 114 of the cam contact surface 108. Concurrently with the second sector gear 93 stopping rotating, as illustrated in FIG. 7A, the second cam surface 139 contacts the fourth surface portion 114, the connection portion between the first cam surface 138 and the second cam surface 139 contacts the fifth surface portion 115, and the switch arm 91 stops pivoting. At this time, the pendulum gear 73 engages the second intermediate input gear 75 and the switching from the forward rotation mode to the reverse rotation mode is completed. Thus, in the reverse rotation mode, the drive force of the motor is transmitted from the drive gear 72, via the pendulum gear 73, the second intermediate input gear 75, the second idle gear 77 and the third idle gear 78, to the ejection roller gear 79, and the ejection roller 38 rotates in the reverse direction integrally with the ejection roller gear 79.

[Reverse Rotation Mode to Stop Mode]

When the solenoid 95 is turned on to off, the drive transmission mechanism 71 is switched from the reverse rotation mode to the stop mode. When the solenoid 95 is turned off, the operation portion 144 of the lever 94 moves downward as illustrated in FIG. 8B. Concurrently with the movement of the operation portion 144, the lever 94 rotates about the lever shaft portion 141 for a fixed angle clockwise viewed from the right side, and the lever 94 is located at the first lever position. At this time, the first engaging portion 127 of the first sector gear 92 and the stopper portion 145 of the second arm portion 143 disengage from each other such that the first sector gear 92 becomes rotatable.

When the first engaging portion 127 of the first sector gear 92 and the stopper portion 145 of the first arm portion 145 disengage from each other, restoring force of the first urging member 151 causes the first sector gear 92 to rotate counterclockwise viewed from the right side. When the first sector gear 92 rotates, the second teeth portion 124B of the first sector gear 92 starts to engage the drive gear 72. When the second teeth portion 124B engages the drive gear 72, the drive force is transmitted from the drive gear 72 to the first sector gear 92. After the second teeth portion 124B starts to engage the drive gear 72, the drive force is transmitted from the drive gear 72 to the first sector gear 92, and the first sector gear 92 rotates.

When the first sector gear 92 rotates, the end of the elongated hole 129 of the first sector gear 92 contacts the protrusion 136 of the second sector gear 93, and the end of the elongated hole 129 presses the protrusion 136 in the rotation direction. This pressing force and the urging force of the third urging member 153 (FIG. 4) causes the second sector gear 93 to start to rotate clockwise viewed from the left side. When the second sector gear 93 rotates, the second teeth portion 134B of the second sector gear 93 starts to engage the drive gear 72. When the second teeth portion 134B engages the drive gear 72, the drive force is transmitted from the drive gear 72 to the second sector gear 93. After the second teeth portion 134B starts to engage the drive gear 72, the drive force is transmitted from the drive gear 72 to the second sector gear 93, and the second sector gear 93 rotates.

Figure 8A:
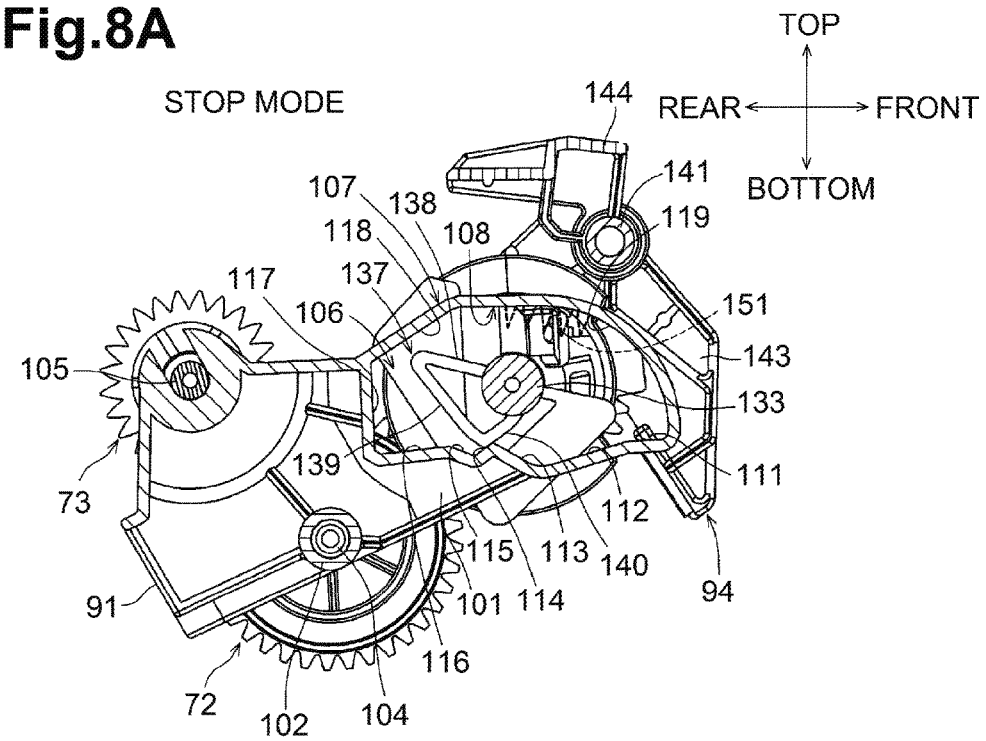
FIG. 8A is a left sectional view partially illustrating the drive transmission mechanism in a stop mode.
Figure 8B:
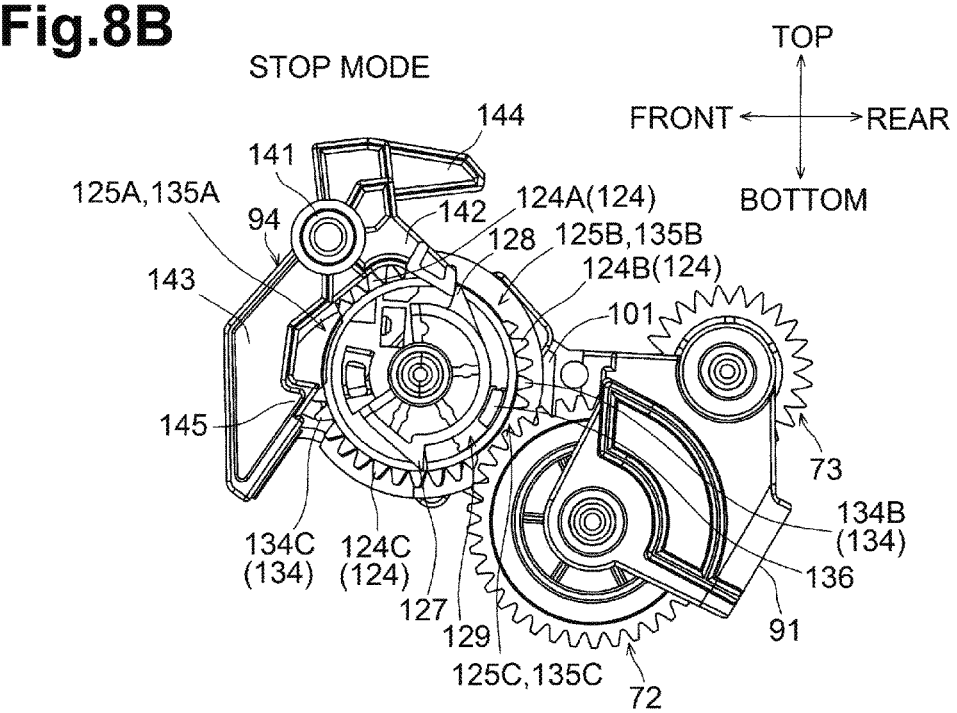
FIG. 8B is a right side view partially illustrating the drive transmission mechanism in the stop mode.

When the second sector gear 93 rotates, the cam 137 rotates clockwise viewed from the left side as illustrated in FIGS. 7A and 8A. As the cam 137 rotates with a state illustrated in FIG. 7A where the second cam surface 139 of the cam 137 is in contact with the fourth surface portion 114 of the cam contact surface 108 and the connection portion between the first cam surface 138 and the second cam surface 139 is in contact with the fifth surface portion 114, the connection portion between the first cam surface 138 and the second cam surface 139 moves on the fifth surface portion 115 toward the sixth surface portion 116, and the second cam surface 139 contacts the sixth surface portion 116. Then, after the connection portion between the second cam surface 139 and the third cam surface 140 contacts the third surface portion 113, and moves over the boundary between the third surface portion 113 and the fourth surface portion 114, the third cam surface 140 contacts the fourth surface portion 114 (FIG. 8A). With the change of the positional relationship between the cam 137 and the cam contact surface 108, the urging force of the second urging member 152 (FIG. 2) causes the switch arm 91 to pivot about the first bearing portion 102 counterclockwise viewed from the left side such that the front end portion of the switch arm 91 moves upward. When the switch arm 91 pivots, the pendulum gear 73 disengages from the second intermediate input gear 75 and moves toward the first intermediate input gear 74.

As illustrated in FIG. 8B, when the rotation of the first sector gear 92 and the second sector gear 93 further advances, the third toothless portion 125C of the first sector gear 92 and the third toothless portion 135C of the second sector gear 93 start to face the drive gear 72, while the second teeth portion 124B of the first sector gear 92 and the second teeth portion 134B of the second sector gear 93 start to disengage from the drive gear 72. When the second teeth portion 124B of the first sector gear 92 and the second teeth portion 134B of the second sector gear 93 disengage from the drive gear 72, the drive force is not transmitted from the drive gear 72 to the first sector gear 92 and the second sector gear 93. Then, the first sector gear 92 and the second sector gear 93 rotate by the urging force of the third urging member 153 until the second engaging portion 128 of the first sector gear 92 engages the end portion of the first arm portion 142 of the lever 94. When the second engaging portion 128 of the first sector gear 92 engages the end portion of the first arm portion 142 of the lever 94, the first sector gear 92 and the second sector gear 93 stop rotating, and the third toothless portion 125C of the first sector gear 92 and the third toothless portion 135C of the second sector gear 93 are kept facing the drive gear 72. After the second engaging portion 128 contacts the end portion of the first arm portion 142, the first urging member 151 is compressed by the urging force of the third urging member 153. Restoring force of the compressed first urging member 151 presses the first engaging portion 128 against the stopper portion 145 and maintains the engagement between the first engaging portion 128 and the end portion of the first arm portion 142.

Concurrently with the first sector gear 92 and the second sector gear 93 stopping rotating, as illustrated in FIG. 8A, the third cam surface 140 of the cam 137 contacts the fourth surface portion 114 of the cam contact surface 108, and the switching from the reverse rotation mode to the stop mode is completed. Under this state, the pendulum gear 73 does not engages the first intermediate input gear 74 and the second intermediate input gear 75. Thus, in the stop mode, the drive force of the motor transmitted to the drive gear 72 is not transmitted from the pendulum gear 73 to the first intermediate input gear 74 and the second intermediate input gear 75. Thus, the first intermediate input gear 74, the second intermediate input gear 75, the first idle gear 76, the second idle gear 77, the third idle gear 78, and the ejection roller gear 79 all stop rotating, and the ejection roller 38 stops rotating.

[Stop Mode to Forward Rotation Mode]

When the solenoid 95 is turned off to on, the drive transmission mechanism 71 is switched from the stop mode to the forward rotation mode. When the solenoid 95 is turned on, the operation portion 144 of the lever 94 moves upward from the state illustrated in FIG. 8B. Concurrently with the movement of the operation portion 144, the lever 94 rotates about the lever shaft portion 141 for a fixed angle counterclockwise viewed from the right side, and the lever 94 moves from the first lever position to the second lever position. At this time, the second engaging portion 128 of the first sector gear 92 and the end portion of the first arm portion 142 disengage from each other such that the first sector gear 92 becomes rotatable.

When the first engaging portion 128 of the first sector gear 92 and the end portion of the first arm portion 142 disengage from each other, restoring force of the first urging member 151 causes the first sector gear 92 to rotate counterclockwise viewed from the right side. When the first sector gear 92 rotates, the third teeth portion 124C of the first sector gear 92 starts to engage the drive gear 72. When the third teeth portion 124C engages the drive gear 72, the drive force is transmitted from the drive gear 72 to the first sector gear 92. After the third teeth portion 124C starts to engage the drive gear 72, the drive force is transmitted from the drive gear 72 to the first sector gear 92, and the first sector 92 rotates.

When the first sector gear 92 rotates, the end of the elongated hole 129 of the first sector gear 92 contacts the protrusion 136 of the second sector gear 93, and the end of the elongated hole 129 presses the protrusion 136 in the rotation direction. This pressing force and the urging force of the third urging member 153 (FIG. 4) causes the second sector gear 93 clockwise viewed from the left side. When the second sector gear 93 rotates, the third teeth portion 134C of the second sector gear 93 starts to engage the drive gear 72. When the third teeth portion 134C engages the drive gear 72, the drive force is transmitted from the drive gear 72 to the second sector gear 93. After the third teeth portion 134C starts to engage the drive gear 72, the drive force is transmitted from the drive gear 72 to the second sector gear 93, and the second sector gear 93 rotates.

When the second sector gear 93 rotates, the cam 137 rotates clockwise viewed from the left side as illustrated in FIGS. 8A and 6A. As the cam 137 rotates with a state illustrated in FIG. 8A where the third cam surface 140 of the cam 137 is in contact with the fourth surface portion 114 of the cam contact surface 108, the third cam surface 140 moves and contacts the boundary between the third surface portion 113 and the fourth surface portion 114. After that, the third cam surface 140 is separated from the boundary between the third surface portion 113 and the fourth surface portion 114 and then the first cam surface 138 contacts the first surface portion 111 (FIG. 6A). With the change of the positional relationship between the cam 137 and the cam contact surface 108, the urging force of the second urging member 152 (FIG. 2) causes the switch arm 91 to pivot about the first bearing portion 102 counterclockwise viewed from the left side such that the front end portion of the switch arm 91 moves upward. The pivoting of the switch arm 91 allows the pendulum gear 73 to engage the second intermediate input gear 74, and the switching from the stop mode to the forward rotation mode is completed.

When the rotation of the first sector gear 92 and the second sector gear 93 further advances, the first toothless portion 125A of the first sector gear 92 and the first toothless portion 135A of the second sector gear 93 start to face the drive gear 72, while the third teeth portion 124C of the first sector gear 92 and the third teeth portion 134C of the second sector gear 93 start to disengage from the drive gear 72. As illustrated in FIG. 6B, when the third teeth portion 124C of the first sector gear 92 and the third teeth portion 134C of the second sector gear 93 disengage from the drive gear 72, the drive force is not transmitted from the drive gear 72 to the first sector gear 92 and the second sector gear 93. Then, the first sector gear 92 and the second sector gear 93 rotate by the urging force of the third urging member 153 until the second engaging portion 127 of the first sector gear 92 engages the end portion of the first arm portion 142 of the lever 94. When the second engaging portion 127 of the first sector gear 92 engages the end portion of the first arm portion 142 of the lever 94, the first sector gear 92 and the second sector gear 93 stop rotating, and the first toothless portion 125A of the first sector gear 92 and the first toothless portion 135A of the second sector gear 93 are kept facing the drive gear 72. After the first engaging portion 127 contacts the first arm portion 142, the first urging member 151 is compressed by the urging force of the third urging member 153. Restoring force of the compressed first urging member 151 presses the first engaging portion 127 against the first arm portion 142 and maintains the engagement between the first engaging portion 127 and the first arm portion 142.

It is noted that, after a fixed time passes after the solenoid 95 is energized, the solenoid 95 is de-energized again. The de-energization of the solenoid 95 causes the lever 94 to return to the first lever position from the second lever position.

As described above, the drive transmission mechanism 71 is capable of changing the state of the ejection roller 38 among forward rotation, reverse rotation, and stopping, without changing the rotation direction of the motor.

The drive transmission mechanism 71 is configured such that, with the vertical movement of the plunger 96 of the solenoid 95, the stopper portion 145 of the lever 94 is moved to engage or disengage from the first engaging portion 127 of the first sector gear 92. The first sector gear 92 is urged in a predetermined direction (counterclockwise viewed from the right side) by the third urging member 151 (FIG. 4). When the stopper portion 145 engages the first engaging portion 127 of the first sector gear 92, the first sector gear 92 is prevented from rotating in the predetermined direction. When the stopper portion 145 disengages from the first engaging portion 127 of the first sector gear 92, the first sector gear 92 rotates in the predetermined direction.

In the reverse rotation mode, the pendulum gear 73 engages the second intermediate input gear 75. In this state, as illustrated in FIG. 7B, the second toothless portion 125B of the first sector gear 92 and the second toothless portion 135B of the second sector gear 93 face the drive gear 72, while the second teeth portion 124B of the first sector gear 92 and the second teeth portion 134B of the second sector gear 93 disengage from the drive gear 72. When the first sector gear 92 rotates, with this state, for a predetermine amount in the predetermined direction, the second teeth portion 124B engages the drive gear 72 and the drive force is transmitted from the drive gear 72 to the first sector gear 92. At this time, the second teeth portion 134B of the second sector gear 93 does not engage the drive gear 72 yet. When the first sector gear 92 rotates over the predetermined amount, the second sector gear 93 starts to rotate in the predetermined direction. When the second sector gear 93 rotates, the second teeth portion 134B engages the drive gear 72 and the drive force is transmitted from the drive gear 72 to the second sector gear 93. The predetermined amount is equal to a rotation amount of the first sector gear 93 until the end of the elongated hole 129 of the first sector gear 92 contacts the protrusion 136 of the second sector gear 93.

The second sector gear 93 is provided with the cam 137. The switch arm 91 has the cam contact surface 108. When the second sector gear 93 rotates, the positional relationship between the cam 137 and the cam contact surface 108 changes, and the switch arm 91 pivots about an axis in common with the drive gear 72. The pivoting movement of the switch arm 91 causes the pendulum gear 73 to engage and disengage from the second intermediate input gear 75.

When the pendulum gear 73 engages the second intermediate input gear 75, the drive force is transmitted from the drive gear 72 via the pendulum gear 73 to the second intermediate input gear 75. Thus, the switch arm 91 holding the pendulum gear 73 receives the drive reaction force from the second intermediate input gear 75 via the pendulum gear 73, and the drive reaction force is transmitted from the cam contact surface 108 of the switch arm 91 to the cam 137. As the first sector gear 92 and the second sector gear 93 engage each other movably with play in their rotation direction, the second sector gear 93 does not rotate when the first sector gear 92 starts to rotate. Until the second sector gear 93 starts to rotate, the urging force of the first urging member 151 required to rotate the first sector gear 92 may be smaller than the drive reaction force to be transmitted to the second sector gear 93. By making the urging force of the first urging member 151 small, impact noise that may occur when the first engaging portion 127 of the first sector gear 92 engages the stopper portion 145 can be reduced. The first engaging portion 127 of the first sector gear 92 engages the stopper portion 145 with small force, which can reduce a load on the solenoid 95 that allows engagement and disengagement between the first engaging portion 127 of the first sector gear 92 and the stopper portion 145, and thus reduce the operating noise of the solenoid 95.

This reduces the operating noise of the solenoid 95 and the impact noise which may occur when the drive force from the pendulum gear 73 to the second intermediate input gear 75 is transmitted or interrupted.

When the second sector gear 93 starts to rotate, the second teeth portion 124B of the first sector gear 92 engages the drive gear 72. Even when the drive reaction force is transmitted to the second sector gear 93, the drive force transmitted from the drive gear 72 allows the first sector gear 92 and the second sector gear 93 to rotate smoothly. Consequently, the switch arm 91 smoothly rotates causing the pendulum gear 73 to be smoothly separated from the second intermediate input gear 75.

The drive transmission mechanism 71 includes the second urging member 152 configured to urge the switch arm 91 in a direction in which the cam contact surface 108 presses the cam 137. The cam contact surface 108 has the fourth surface portion 114 and the fifth surface portion 115. In the reverse rotation mode, as illustrated in FIG. 7A, the second cam surface 139 of the cam 137 contacts the fourth surface portion 114, and the connection portion between the first cam surface 138 and the second cam surface 139 contacts the fifth surface portion 115. The urging force of the second urging member 152 and the drive reaction force applied to the switch arm 91 cause the cam 137 to receive a pressing force acting in a first direction D1 perpendicular to the fourth surface portion 114 therefrom and a pressing force acting in a second direction D2 perpendicular to the fifth surface portion 115 therefrom. The fourth surface portion 114 and the fifth surface portion 115 are located respectively to the front side and the rear side relative to a straight line L extending in a radial direction from the rotation center of the second sector gear 93. An angle of inclination of the fourth surface portion 114 and an angle of inclination of the fifth surface portion 115 are set such that the resultant vector of the pressing force acting in the first direction D1 and the pressing force acting in the second direction D2 is directed from the connection portion between the first cam surface 138 and the second cam surface 139 toward the rotation center of the cam 137 or the boss 133 of the second sector gear 93. In the reverse rotation mode, the urging force of the second urging member 152 and the drive reaction force applied to the switch arm 91 fix the position of the cam 137 relative to the cam contact surface 108, which stabilizes the states of structural elements. An elastic force of the second urging member 152 can be reduced by only an amount equivalent to the drive reaction force. In switching the operation modes, the switch arm 91 can be caused to smoothly pivot.

The second sector gear 93 includes the boss 133 rotatably held by the left side plate (not illustrated) disposed in the main body casing 2, while the first sector gear 92 includes the boss 123 into which the boss 133 of the first sector gear 92 is inserted movably with play. This prevents excessive load from being applied to the boss 133 of the second sector gear 93 when the lever 94 disengages from the first engaging portion 127 or the second engaging portion 128 of the first sector gear 92. Thus, the potential of the boss 133 from being deformed, e.g., curved, or damaged can be minimized.

The first sector gear 92 has the elongated hole 129, while the second sector gear 93 has the protrusion 136 having a dimension smaller in the rotation direction than the dimension of the elongated hole 129. The first sector gear 92 and the second sector gear 93 engage each other movably with play in their rotation direction by inserting the protrusion 136 into the elongated hole 129.

The disclosure is applied to the laser printer 1 as an example of an image forming apparatus. However, the disclosure is not limited to the laser printer 1. The disclosure is applicable to other types of image forming apparatus such as an ink jet printer.

While the description has been made in detail with reference to the embodiment thereof, it would be apparent to those skilled in the art that many modifications and variations may be made therein without departing from the spirit of the disclosure.

What is claimed is:

1. A drive transmission device comprising:
a first gear;
a second gear spaced apart from the first gear and rotatable about a first axis; a switch arm pivotable about the first axis;
a third gear held by the switch arm such that the third gear is rotatable and disposed in engagement with the second gear, the third gear being configured to engage and disengage from the first gear in response to pivoting of the switch arm;
a first sector gear including an engaging portion and a first teeth portion configured to engage the second gear, the first sector gear being rotatable about a second axis in a predetermined direction;
a second sector gear including a second teeth portion configured to engage the second gear, the second sector gear being rotatable about the second axis in the predetermined direction, the second sector gear engaging the first sector gear movably with play in the predetermined direction;
a lever including a lever engaging portion configured to engage the engaging portion of the first sector gear, wherein the first sector gear is not rotatable in the predetermined direction while the lever engaging portion engages the engaging portion of the first sector gear;
a solenoid connected to the lever and configured to move the lever between an engaging state where the lever engaging portion engages the engaging portion of the first sector gear and a disengaging state where the lever engaging portion is disengaged from the engaging portion of the first sector gear; and
a first urging member configured to urge the first sector gear in the predetermined direction, wherein:
the switch arm has a cam contact surface;
the second sector gear further includes a cam configured to contact the cam contact surface of the switch arm, wherein, as the second sector gear rotates, positional relationship between the cam and the cam contact surface changes and the switch arm pivots;
the first sector gear further includes a first toothless portion, wherein, when the third gear engages the first gear, the first toothless portion faces the second gear;

the second sector gear further includes a second toothless portion, wherein, when the third gear engages the first gear, the second toothless portion faces the second gear; and when the first sector gear rotates in the predetermined direction for a predetermined amount from a state where the third gear is engaged with the first gear, the first teeth portion engages the second gear, and after the second sector gear rotates in the predetermined direction for a predetermined amount the second teeth portion engages the second gear, resulting in the switch arm pivoting and disengaging the third gear from the first gear.

2. The drive transmission device according to claim 1, further comprising a second urging member configured to urge the switch arm in a direction where the cam contact surface presses the cam, wherein the cam contact surface of the switch arm includes a first area and a second area, and wherein, when the second toothless portion of the second sector gear faces the second gear, the first area of the cam contact surface presses the cam in a first direction, and the second area of the cam contact surface presses the cam in a second direction crossing the first direction.

3. The drive transmission device according to claim 2, wherein the first area and the second area are located opposite to each other relative to a straight line extending in a radial direction of the second sector gear from a rotation center of the second sector gear.

4. The drive transmission device according to claim 1, wherein the second sector gear includes a shaft portion, and wherein the first sector gear has a shaft hole receiving the shaft portion of the second sector gear therein movably with play.

5. The drive transmission device according to claim 1, wherein one of the first sector gear and the second sector gear is provided with an elongated hole extending in the predetermined direction, and the other one is provided with a protrusion, and wherein the first sector gear and the second sector gear engage each other movably with play in the predetermined direction by engagement of the protrusion in the elongated hole.

6. The drive transmission device according to claim 1, wherein the first urging member includes a coil spring, the coil spring having a first end and a second end opposite to the first end, the first end being connected to the first sector gear, the second end being connected to the second sector gear.

7. An image forming apparatus comprising:

an image forming unit configured to form an image on a sheet; a tray configured to support the sheet;

an ejection roller configured to eject, to the tray, or convey, to a reverse conveying path, the sheet having an image thereon formed at the image forming unit; and a drive transmission mechanism configured to transmit a drive force to the ejection roller, wherein the drive transmission mechanism includes the drive transmission device according to claim 1.

* * * * *